(12) United States Patent
Yamanaka et al.

(10) Patent No.: US 11,461,938 B2
(45) Date of Patent: Oct. 4, 2022

(54) ULTRASONIC IMAGING DEVICE AND IMAGE PROCESSING DEVICE

(71) Applicant: Hitachi, Ltd., Tokyo (JP)

(72) Inventors: Kazuhiro Yamanaka, Tokyo (JP); Hiroki Tanaka, Tokyo (JP); Junichi Shiokawa, Tokyo (JP); Tomofumi Nishiura, Tokyo (JP)

(73) Assignee: FUJIFILM HEALTHCARE CORPORATION, Chiba (JP)

( * ) Notice: Subject to any disclaimer, the term of this patent is extended or adjusted under 35 U.S.C. 154(b) by 234 days.

(21) Appl. No.: 16/802,606

(22) Filed: Feb. 27, 2020

(65) Prior Publication Data

US 2020/0320750 A1 Oct. 8, 2020

(30) Foreign Application Priority Data

Apr. 4, 2019 (JP) .............................. JP2019-072291

(51) Int. Cl.
*G06T 11/00* (2006.01)
*G06N 3/04* (2006.01)
*G06N 3/08* (2006.01)

(52) U.S. Cl.
CPC .............. *G06T 11/003* (2013.01); *G06N 3/04* (2013.01); *G06N 3/08* (2013.01); *G06T 2207/20081* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2009/0299185 A1* | 12/2009 | Oikawa | A61B 8/4254 600/447 |
| 2011/0169510 A1* | 7/2011 | Kandori | G01D 5/24 324/686 |
| 2018/0061058 A1* | 3/2018 | Xu | G06N 3/0454 |
| 2018/0174001 A1* | 6/2018 | Kang | G06K 9/6262 |
| 2019/0295295 A1* | 9/2019 | Hyun | G06N 20/00 |
| 2019/0336108 A1* | 11/2019 | Hope Simpson | A61B 8/0891 |
| 2020/0051239 A1* | 2/2020 | Braun | G06K 9/6269 |
| 2020/0281570 A1* | 9/2020 | Sato | G06N 3/084 |

FOREIGN PATENT DOCUMENTS

WO 2018/127497 A1 7/2018

* cited by examiner

*Primary Examiner* — Jiangeng Sun
(74) *Attorney, Agent, or Firm* — Mattingly & Malur, PC

(57) ABSTRACT

An object of the invention is to provide a user with information that serves as a material for determining whether an image generated by processing including a neural network is valid. A reception signal output by an ultrasonic probe that has received an ultrasonic wave from a subject is received, and an ultrasonic image is generated based on the reception signal. A trained neural network receives the reception signal or the ultrasonic image, and outputs an estimated reception signal or an estimated ultrasonic image. A validity information generation unit generates information indicating validity of the estimated reception signal or the estimated ultrasonic image by using one or more of the reception signal, the ultrasonic image, the estimated reception signal, the estimated ultrasonic image, and output of an intermediate layer of the neural network.

11 Claims, 13 Drawing Sheets

[FIG. 1A]
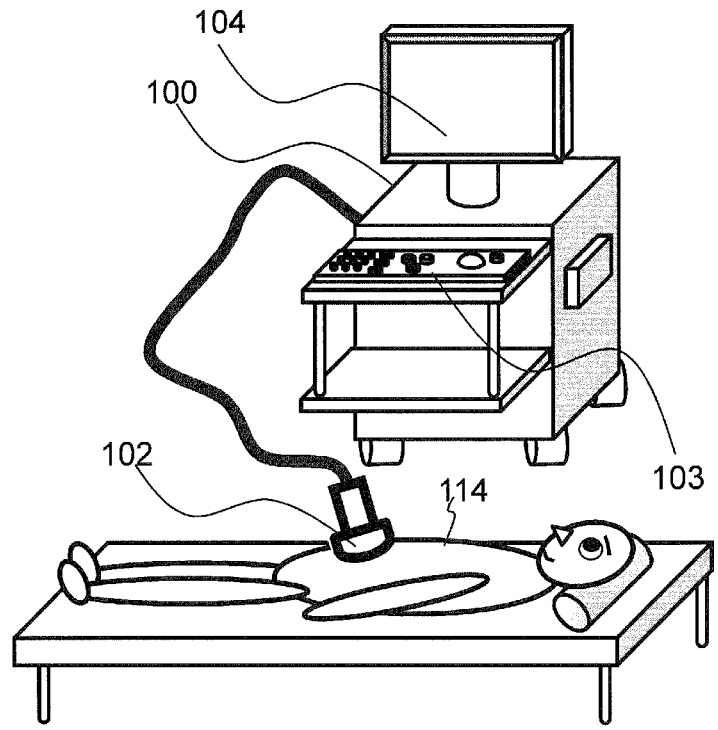
[FIG. 1B]
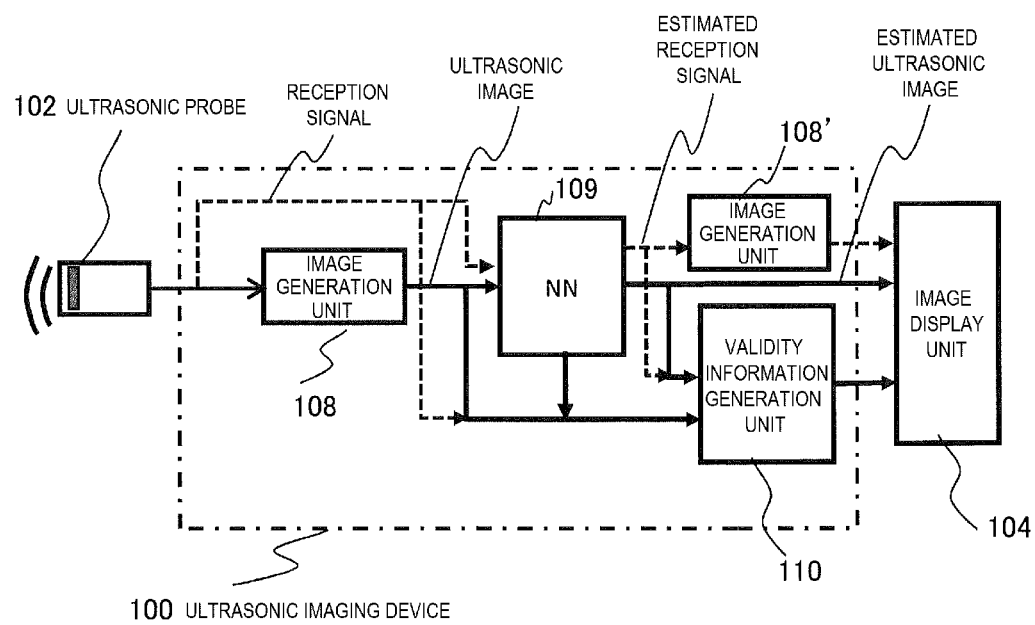

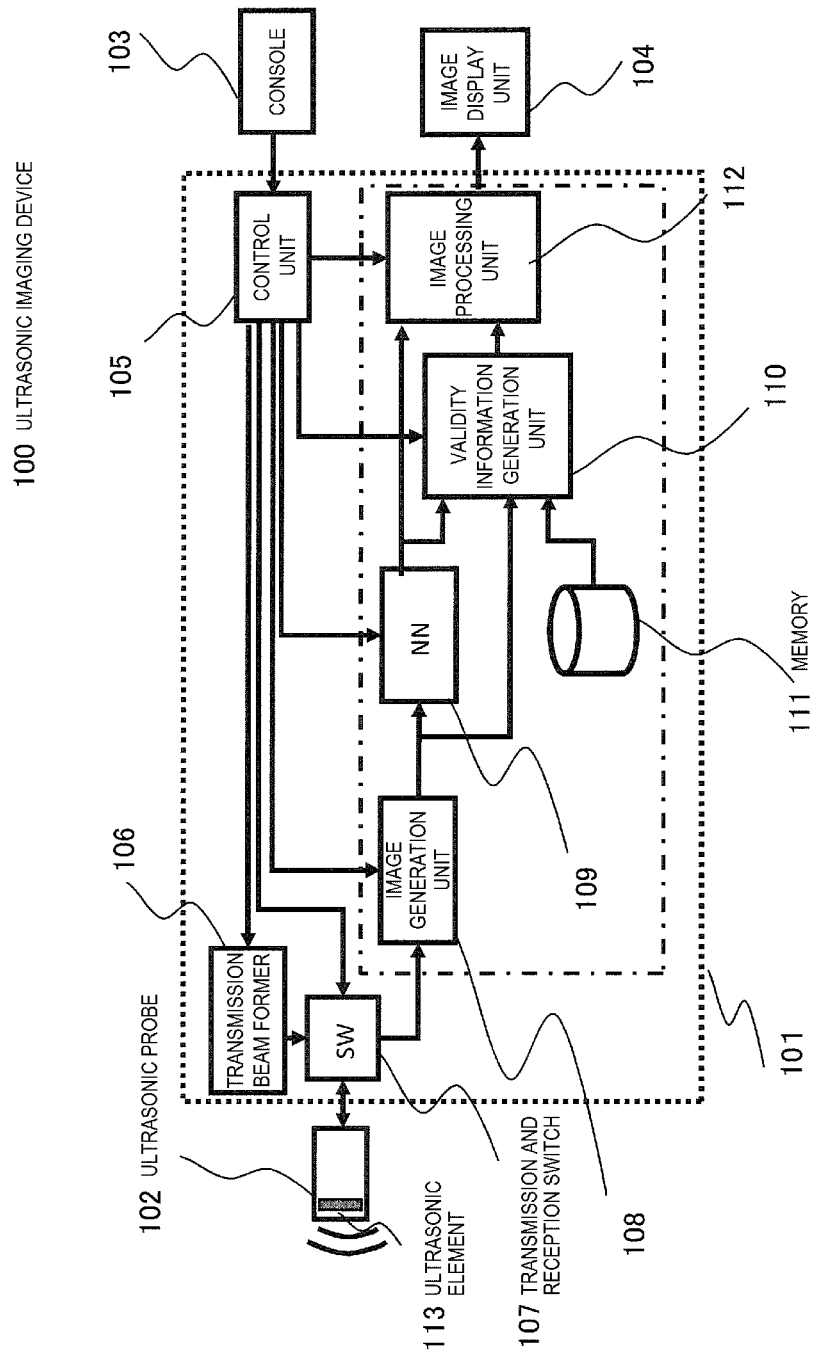
[FIG. 2]

[FIG. 3A]
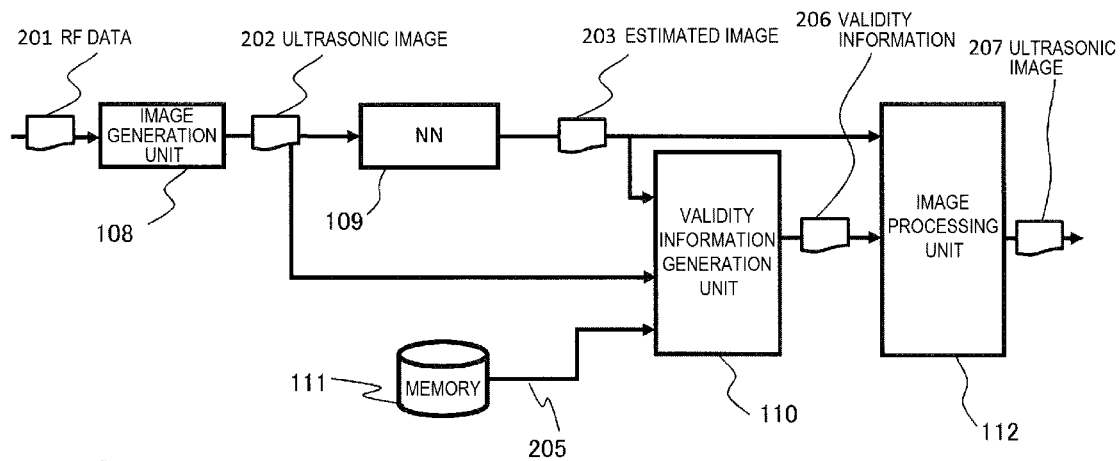
[FIG. 3B]
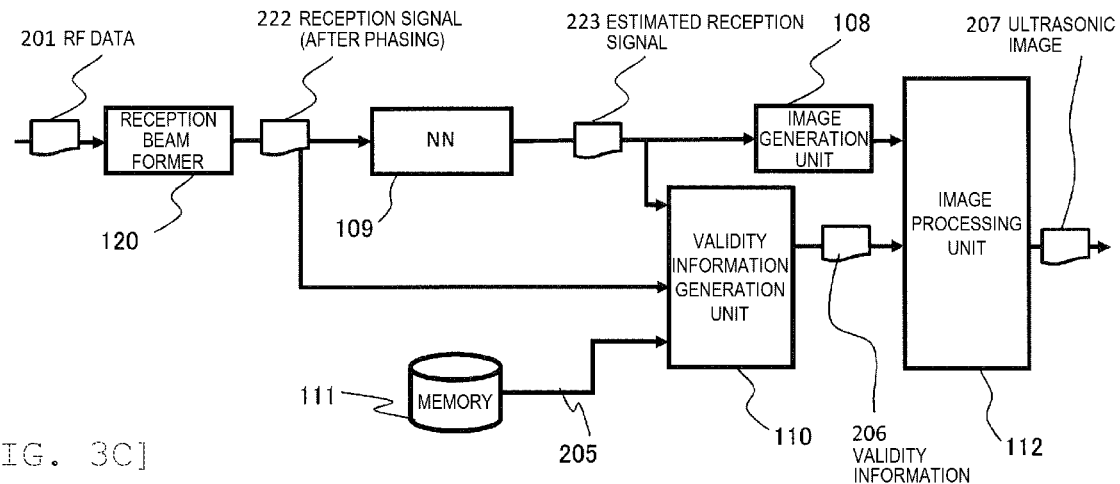
[FIG. 3C]
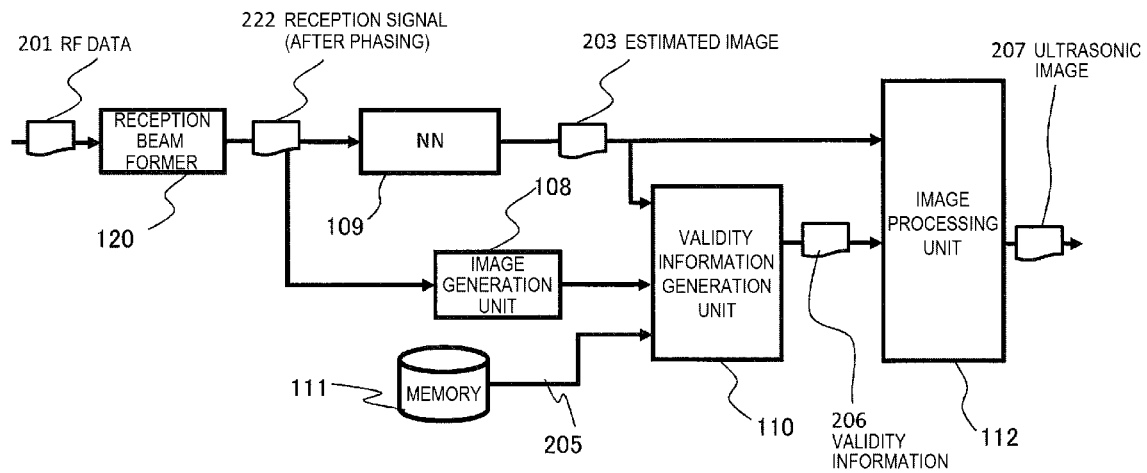

[FIG. 4A]
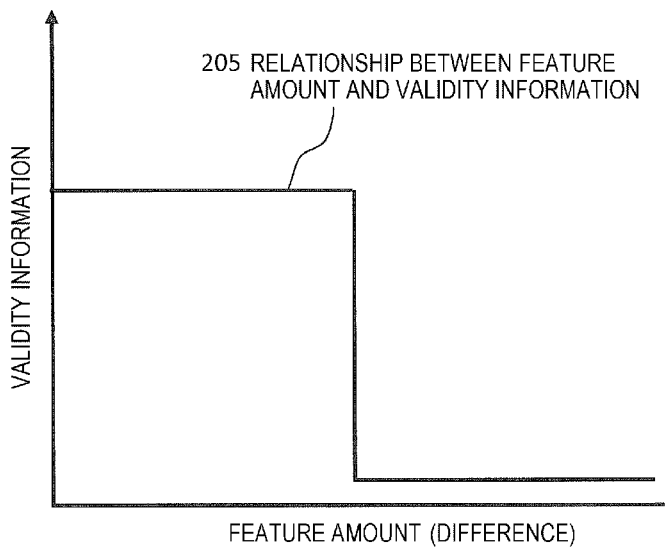
[FIG. 4B]
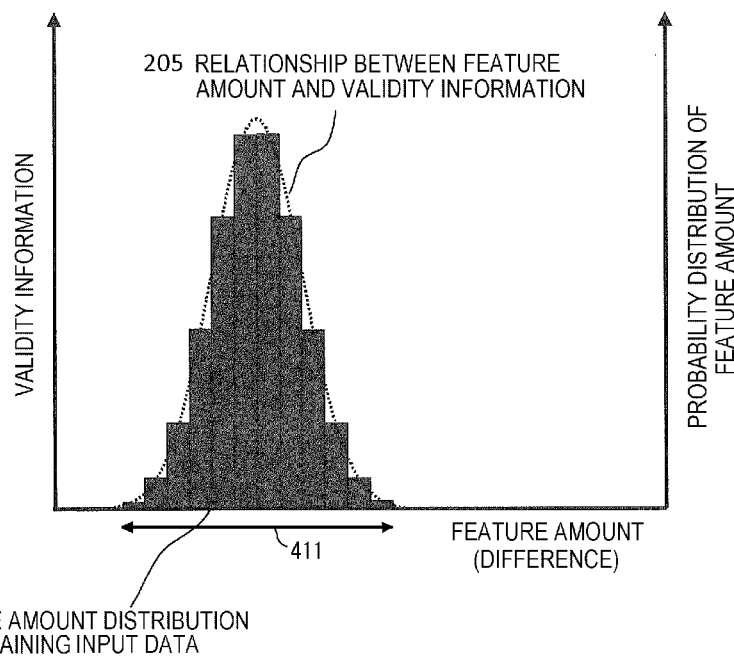

[FIG. 5]
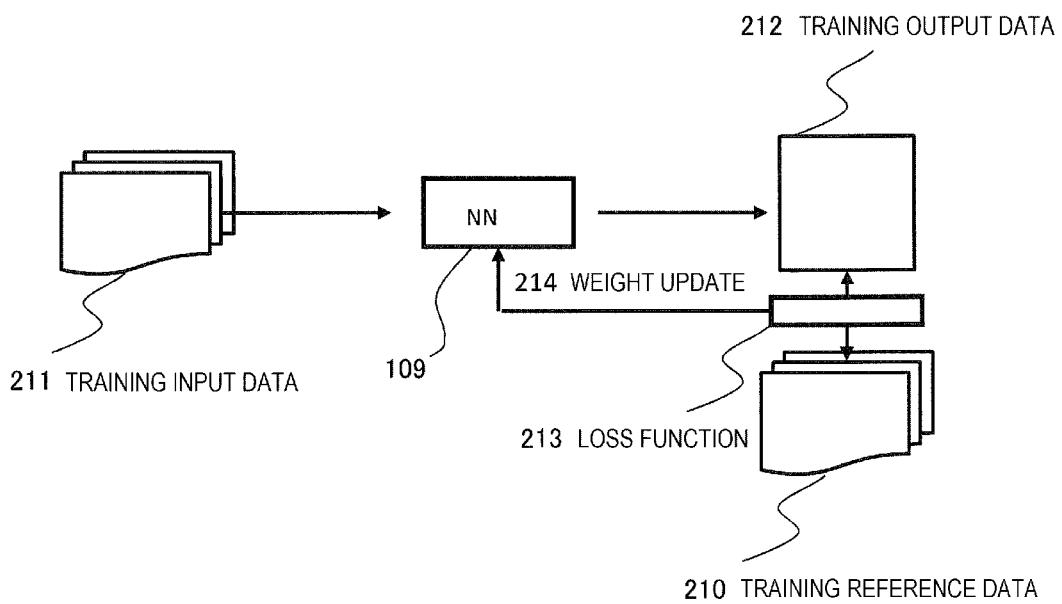

[FIG. 6]
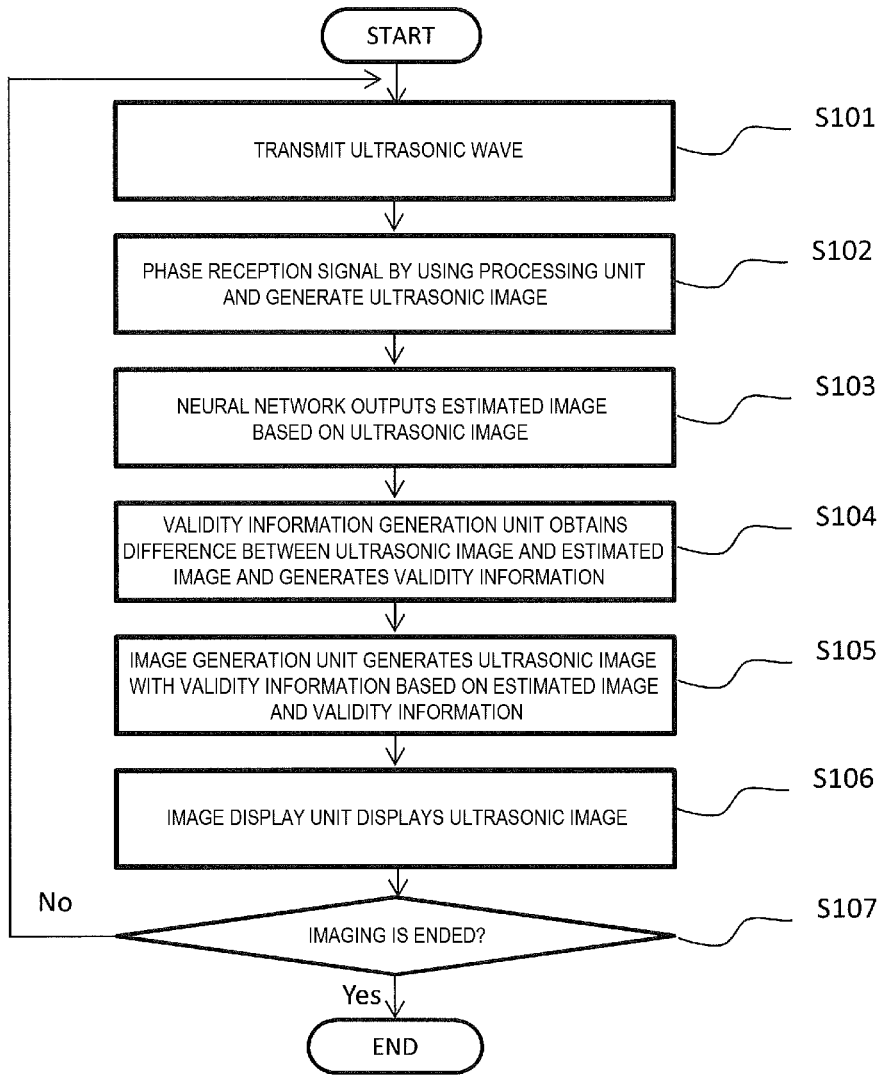

[FIG. 7]
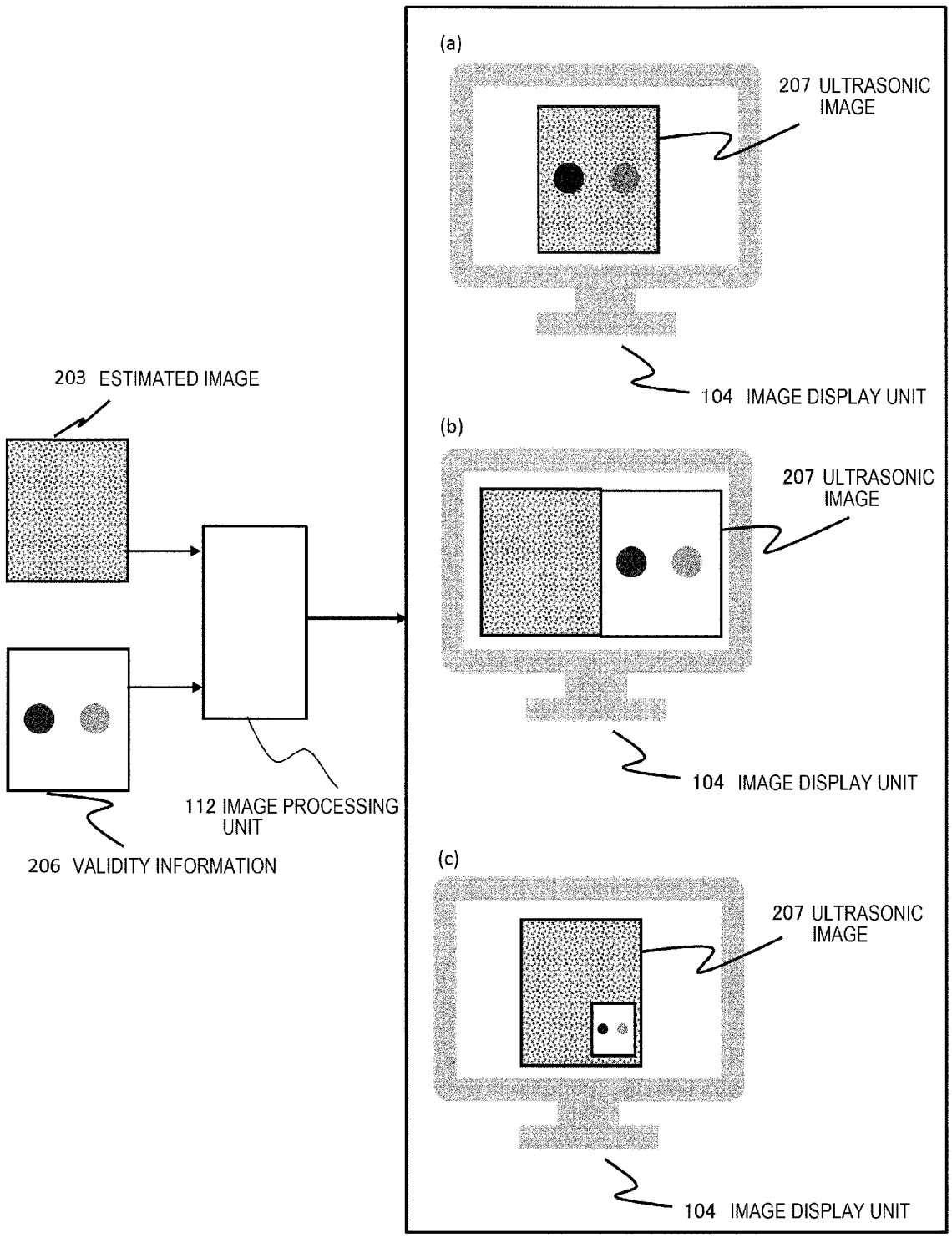

[FIG. 8]
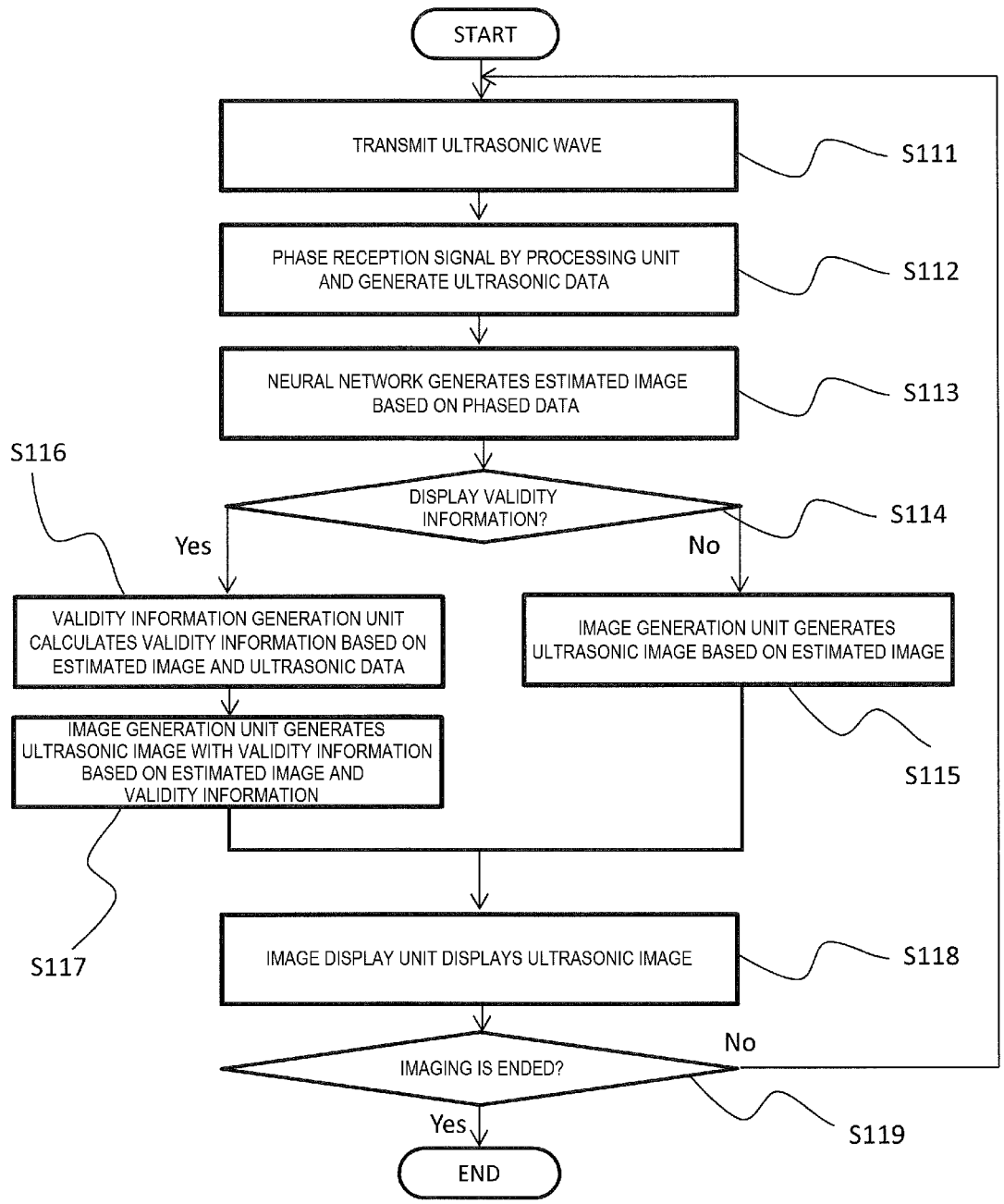

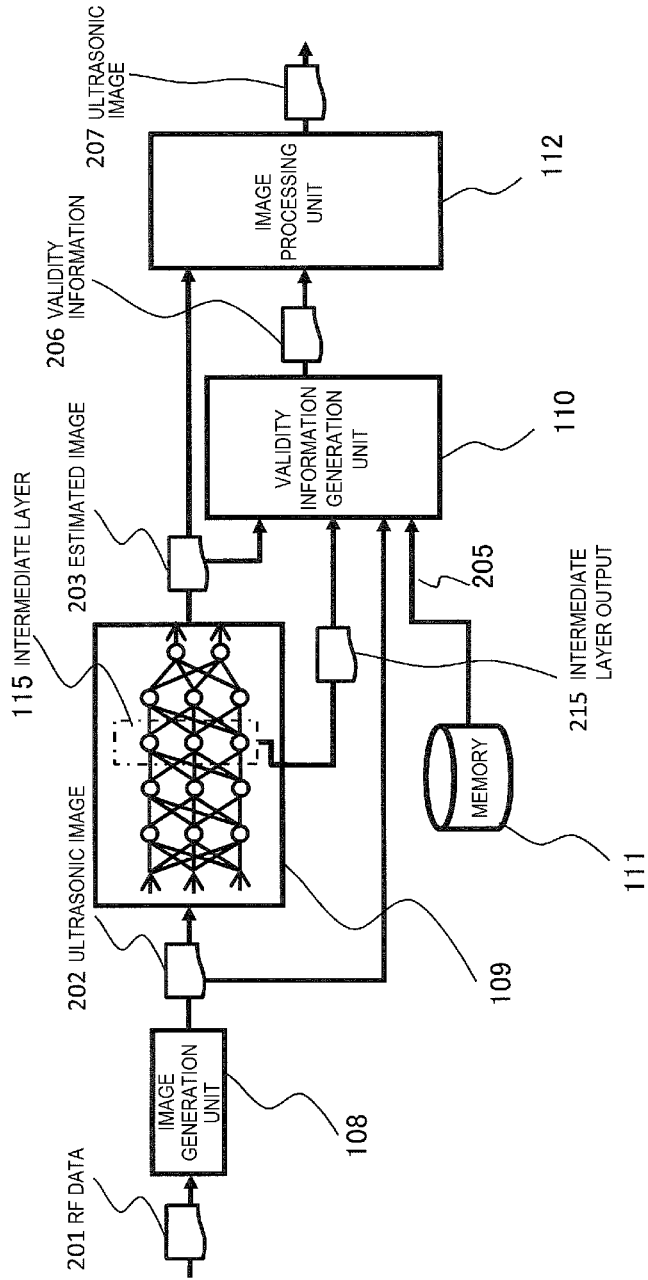

[FIG. 10]
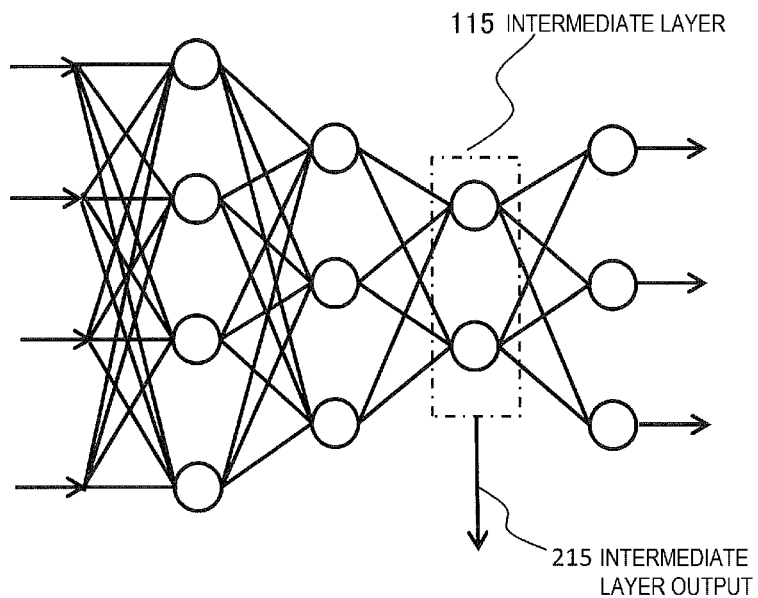
[FIG. 11]
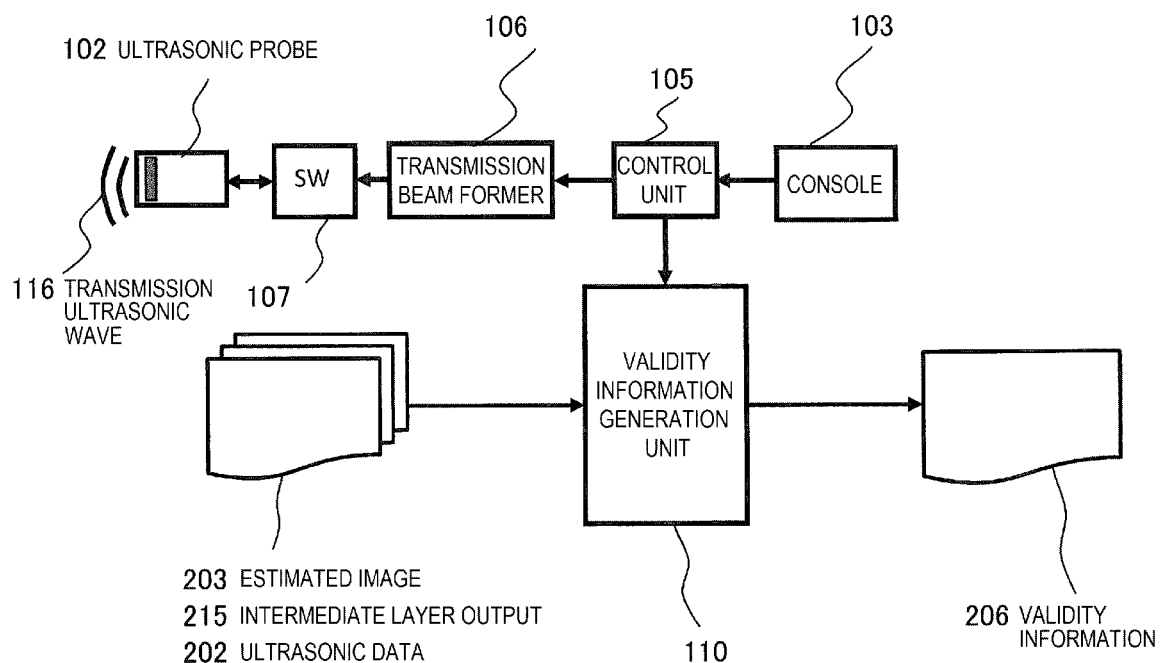

[FIG. 12]
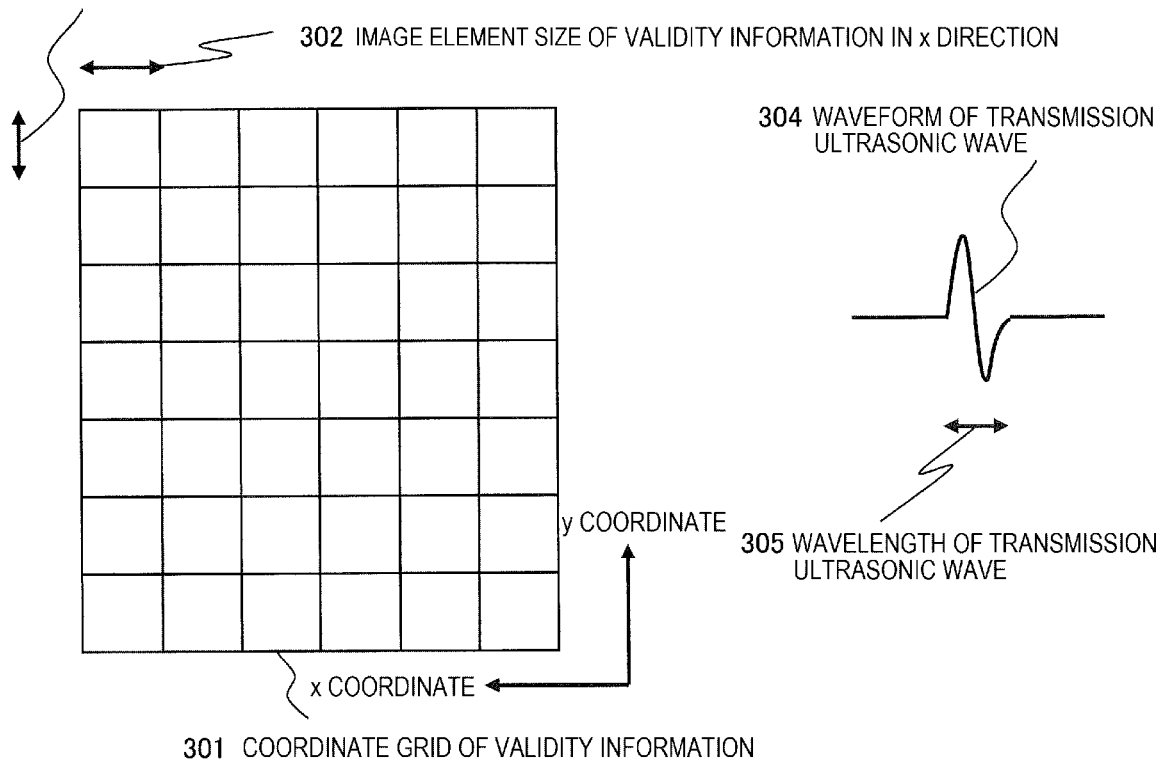

[FIG. 13]
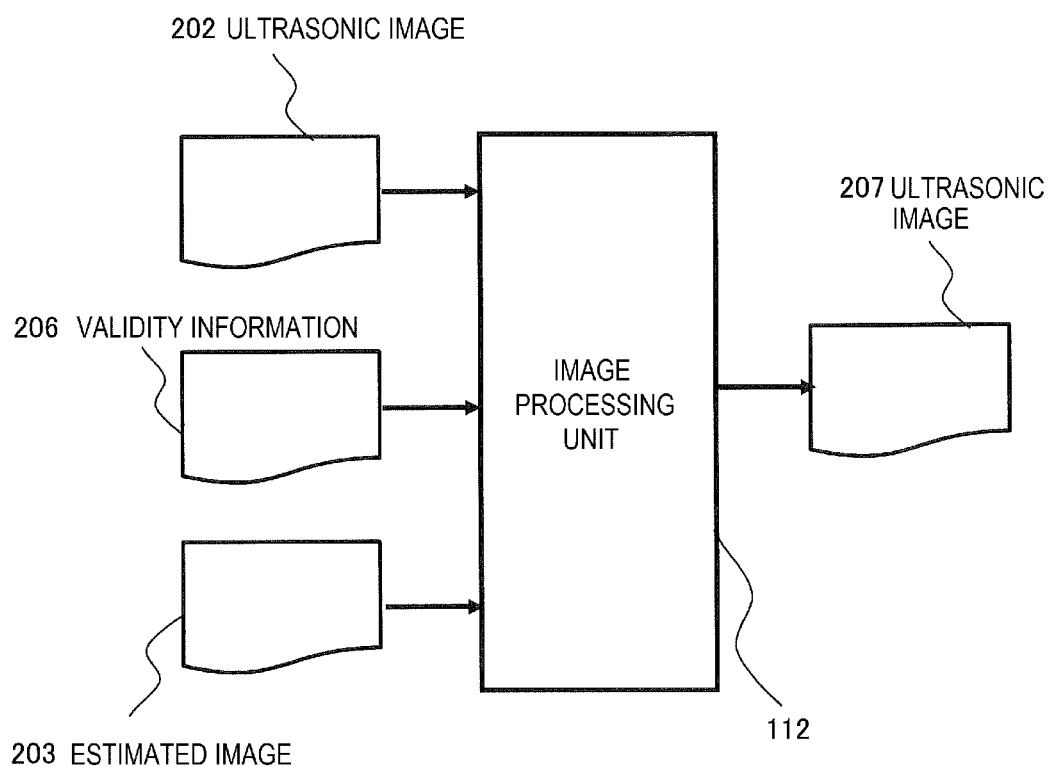

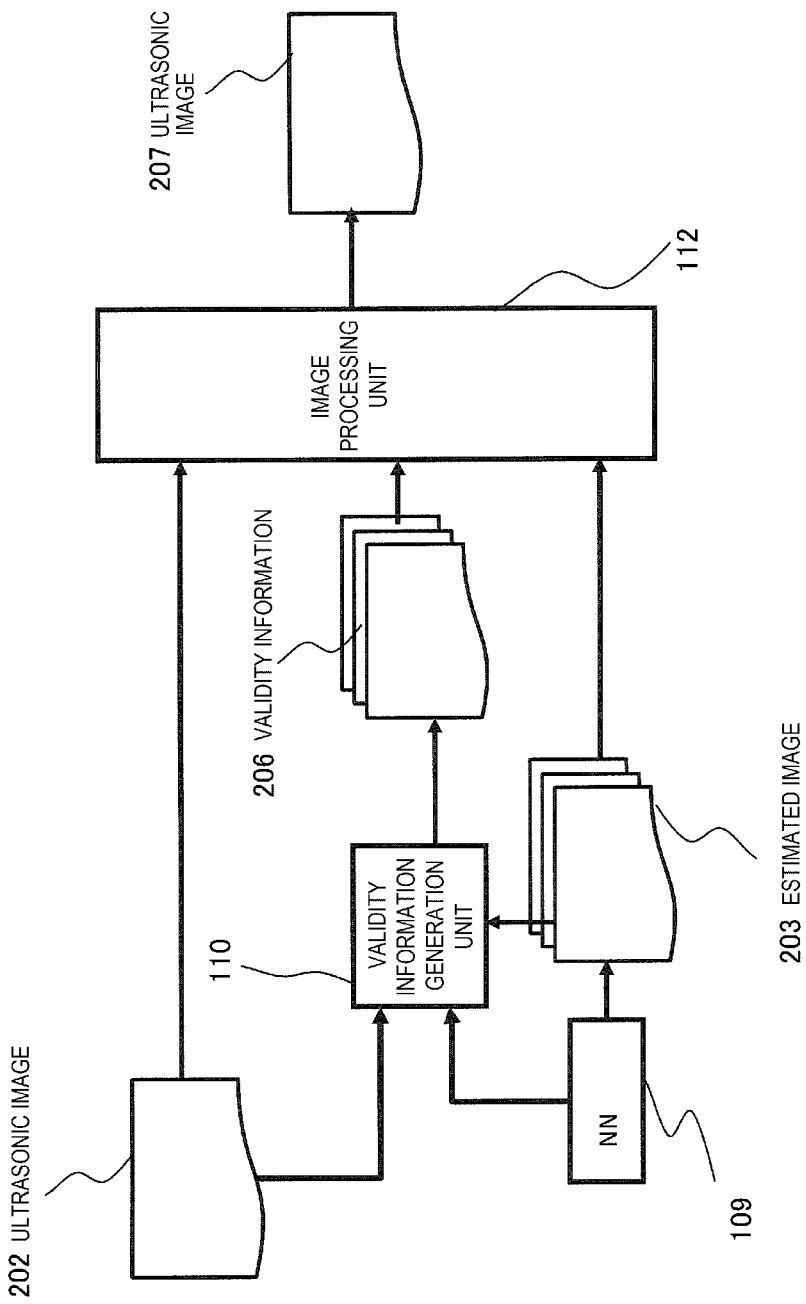

ULTRASONIC IMAGING DEVICE AND
IMAGE PROCESSING DEVICE

CROSS-REFERENCE TO RELATED
APPLICATION

The present application claims priority from Japanese application JP 2019-072291, filed on Apr. 4, 2019, the contents of which is hereby incorporated by reference into this application.

TECHNICAL FIELD

The present invention relates to an ultrasonic imaging technique for imaging an image in a subject by using an ultrasonic wave, and relates to a technique of using an algorithm trained by a machine learning method for image reconstruction.

BACKGROUND ART

An ultrasonic imaging technique is a technique for non-invasively imaging an inside of a subject such as a human body using an ultrasonic wave (a sound wave that is not intended to be heard, generally a sound wave having a high frequency of 20 kHz or higher).

In recent years, due to advances in a machine learning technique centering on techniques such as a neural network and deep learning, a plurality of examples of reconstruction processing and image quality improvement processing, which use the machine learning technique, have been disclosed in imaging that is performed by using the ultrasonic imaging technique. By training the neural network using a set of input data to the neural network and target training data for output of the neural network, desired output can be obtained with high accuracy even for unknown input data. If a signal before being imaged is the input data and imaged data is the training data, the neural network performs image reconstruction processing, and if the imaged data is used for both the input data and the training data, the neural network can also improve the image quality.

For example, Patent Literature 1 discloses an ultrasonic imaging system that outputs image data from a neural network, which uses an ultrasonic echo signal, a signal beam formed based on the echo signal, or both as input to the neural network. The neural network is trained by the machine learning method and can be used to replace ultrasonic imaging processing in the related art, to obtain higher quality images, and obtain tissue property information, blood flow information, and the like without giving an explicit physical model.

CITATION LIST

Patent Literature

PTL 1: WO 2018/127497

SUMMARY OF INVENTION

Technical Problem

The neural network usually determines weights used for calculation at each node through training based on a large amount of data, and can output a highly accurate target image, signal, and the like. When processing based on data is compared with model-based processing, which is determined in advance, it may be difficult to intuitively understand a behavior of the neural network. In particular, it is difficult to predict the behavior of the neural network for unknown input. Therefore, it is difficult for a person who has viewed an image, a signal, or the like output from the neural network to determine whether the output is valid from only the output.

The ultrasonic imaging device described in PTL 1 has a configuration in which the neural network trained by machine learning is included in an imaging process, and thus the neural network generates an image from a reception signal that is unknown input. Therefore, it is difficult for a user who has viewed an image generated and displayed by the neural network to determine whether the image is a valid image.

An object of the invention is to provide a user with information that serves as a material for determining whether an image generated by processing including a neural network is valid.

Solution to Problem

In order to achieve the above object, an ultrasonic imaging device of the invention includes: an image generation unit configured to receive a reception signal output by an ultrasonic probe that has received an ultrasonic wave from a subject, and generate an ultrasonic image based on the reception signal; a trained neural network configured to receive the reception signal or the ultrasonic image generated by the image generation unit, and output an estimated reception signal or an estimated ultrasonic image; and a validity information generation unit configured to generate information indicating validity of the estimated reception signal or the estimated ultrasonic image by using one or more of the reception signal, the ultrasonic image, the estimated reception signal, the estimated ultrasonic image, and output of an intermediate layer of the neural network.

Advantageous Effect

According to the invention, since the information indicating the validity of the image generated by using the neural network can be displayed by the ultrasonic imaging device, a user can determinate the validity of the image.

BRIEF DESCRIPTION OF DRAWINGS

FIG. 1A is a perspective view of an entire ultrasonic imaging device according to an embodiment, and FIG. 1B is a block diagram showing a schematic configuration of the ultrasonic imaging device of the present embodiment.

FIG. 2 is a block diagram showing a configuration of the entire ultrasonic imaging device according to the embodiment.

FIGS. 3A to 3C are block diagrams showing details of a data flow from a reception signal processing unit to an image processing unit in an ultrasonic imaging device main body according to the embodiment.

FIGS. 4A and 4B are graphs showing a predetermined relationship between an absolute value of a difference (feature value) and a value indicating validity.

FIG. 5 is a conceptual diagram showing a calculation flow when a neural network is trained according to Embodiment 1.

FIG. 6 is a flowchart showing a flow of operations according to Embodiment 1.

FIG. 7 is a diagram showing examples of ultrasonic images generated by an image processing unit according to Embodiment 1.

FIG. 8 is a flowchart showing a method for changing operations of the image processing unit in accordance with input of a user according to Embodiment 1.

FIG. 9 is a block diagram showing details of a configuration and a data flow from a reception signal processing unit to an image processing unit in an ultrasonic imaging device main body according to Embodiment 2.

FIG. 10 is an explanatory diagram showing an example of a configuration of a neural network according to Embodiment 2.

FIG. 11 is a block diagram showing a data flow during changing of processing of a validity information generation unit according to a wavelength of an ultrasonic wave to be transmitted according to Embodiment 3.

FIG. 12 is a conceptual diagram showing the data flow during the changing of the processing of the validity information generation unit according to the wavelength of the ultrasonic wave to be transmitted according to Embodiment 3.

FIG. 13 is a block diagram showing a data flow when an image processing unit changes image processing based on validity information according to Embodiment 4.

FIG. 14 is a block diagram showing the data flow when the image processing unit changes the image processing based on the validity information according to Embodiment 4.

DESCRIPTION OF EMBODIMENTS

An embodiment of the invention will be described with reference to the drawings.

As shown in FIGS. 1A and 1B, an ultrasonic imaging device according to the present embodiment includes an image generation unit 108, a trained neural network 109, and a validity information generation unit 110. The image generation unit 108 receives a reception signal output from an ultrasonic probe 102 and generates an ultrasonic image based on the reception signal. The neural network 109 receives the reception signal or the ultrasonic image that is generated by the image generation unit 108 and outputs an estimated reception signal or an estimated ultrasonic image. The validity information generation unit 110 generates information indicating validity of the estimated reception signal or the estimated ultrasonic image by using one or more of the reception signal, the ultrasonic image, the estimated reception signal, the estimated ultrasonic image, and output of an intermediate layer of the neural network 109.

For example, the validity information generation unit 110 is configured to perform a calculation (for example, a calculation for obtaining a difference) of comparing two or more of the reception signal, the ultrasonic image, the estimated reception signal, the estimated ultrasonic image, and the output of the intermediate layer of the neural network to generate the information indicating the validity based on a calculation result (difference).

As another example, the validity information generation unit 110 is configured to extract feature value from one of the reception signal, the ultrasonic image, the estimated reception signal, the estimated ultrasonic image, and the output of the intermediate layer of the neural network, and obtain a value indicating validity corresponding to the extracted feature value based on a predetermined relationship between the feature value and the value indicating the validity.

Because of such a configuration, the ultrasonic imaging device of the present embodiment can display the estimated ultrasonic image or the ultrasonic image generated by the image generation unit from the estimated reception signal, and the information indicating the validity of the estimated ultrasonic image or the ultrasonic image on the image display unit 104. Therefore, a user can easily determine the validity of the image and the like output from the neural network 109.

Embodiment 1

An ultrasonic imaging device 100 according to Embodiment 1 will be described in detail with reference to FIGS. 1A, 2 and 3A.

In Embodiment 1, the validity information generation unit 110 obtains a difference between a reception signal or an ultrasonic image input to the neural network 109 and an estimated reception signal or an estimated ultrasonic image output from the neural network 109, and generates information indicating validity based on the difference.

FIG. 1A shows a perspective view of the entire ultrasonic imaging device 100, FIG. 2 shows a schematic configuration of the entire ultrasonic imaging device 100, and FIG. 3A shows a detailed configuration diagram of a part of the device. The ultrasonic imaging device 100 includes an ultrasonic imaging device main body 101, the ultrasonic probe 102 including one or more ultrasonic elements 113 for transmitting and receiving ultrasonic waves, a console 103 where a user inputs a parameter, and the image display unit 104 displaying the ultrasonic image.

The ultrasonic imaging device main body 101 includes a transmission beam former 106, a transmission and reception switch 107 switching between transmission and reception of signals between the ultrasonic probe 102 and the main body 101, the image generation unit 108, the trained neural network 109, the validity information generation unit 110 generating information 206 indicating validity of output of the neural network 109, an image processing unit 112, and a control unit 105 transmitting a control signal to each component of each of the above-described components 106 to 112 of the ultrasonic imaging device. The console 103 is connected to the control unit 105 of the main body 101, and the image display unit 104 is connected to the image processing unit 112 to form the ultrasonic imaging device 100.

The transmission beam former 106 generates a transmission signal delayed by a predetermined amount, and outputs the transmission signal to a plurality of the ultrasonic elements 113 forming the ultrasonic probe 102. Accordingly, each of the plurality of ultrasonic elements 113 transmits an ultrasonic wave delayed by the predetermined amount to a subject 114. The transmitted ultrasonic wave is reflected by the subject 114, returned to the ultrasonic element 113, received by the ultrasonic element 113, and converted into a reception signal. The reception signal is converted into a digital signal by an AD converter (not shown), becomes RF data 201, and is sent to the image generation unit 108 via the transmission and reception switch 107.

The image generation unit 108 processes the RF data 201 and generates an ultrasonic image 202 that is input data of the neural network 109. The image generation unit 108 performs general signal processing on RF data such as low-pass, high-pass, and band-pass filter processing, or performs phasing processing using a delay-and-sum method or the like to reconstruct an ultrasonic image. The ultrasonic image 202 may be a so-called B-mode image, a Doppler image for viewing a flow, or an elastic information image for viewing hardness of a tissue. Further, processing performed by the image generation unit 108 may include various processing performed when generating these images.

The neural network 109 is a network that receives the ultrasonic image 202 and outputs an estimated ultrasonic image (hereinafter referred to as an estimated image) 203, and is a trained network trained in advance using training data by a machine learning method. An example of the training data will be described later. The neural network 109 may be any network trained by the machine learning method, and, for example, a convolutional neural network or a recursive neural network can be used.

The image generation unit 108 generates an ultrasonic image of the same type as the input data used by the neural network 109 for training. The estimated image 203 output from the neural network 109 has the same data format as the ultrasonic data 202. That is, when the ultrasonic image 202 is in a two-dimensional image format, the estimated image 203 is also in a two-dimensional image format.

The validity information generation unit 110 generates the validity information 206 that is information indicating validity of the estimated image 203 output from the neural network 109. Here, the validity information generation unit 110 performs calculation (for example, calculation for obtaining a difference) using the estimated image 203 and the ultrasonic image 202 to calculate the validity information 206.

The image generation unit 108, the neural network 109, and the validity information generation unit 110 can be implemented by software, and a part of or all the units can also be implemented by hardware. When the above units are implemented by software, the units are configured with a processor such as a central processing unit (CPU) or a graphics processing unit (GPU) and a memory, and implement functions of the image generation unit 108, the neural network 109, and the validity information generation unit 110 by reading and executing programs stored in advance in the memory. Further, when the above units are implemented by hardware, a circuit may be designed using a custom IC such as an application specific integrated circuit (ASIC) or a programmable IC such as a field-programmable gate array (FPGA) so as to implement at least operations of the image generation unit 108, the neural network 109, and the validity information generation unit 110.

The operation of the validity information generation unit 110 will be described. The validity information generation unit 110 calculates a difference between values of image elements corresponding to the ultrasonic image 202 input to the neural network 109 and the estimated image 203 of the neural network, and generates an absolute value thereof. The validity information generation unit 110 outputs the absolute value of the difference as the validity information 206.

Further, the validity information generation unit 110 may obtain the difference between the image element values corresponding to the ultrasonic image 202 and the estimated image 203, further obtain the absolute value thereof, and obtain a value indicating validity corresponding to the obtained difference with reference to a predetermined relationship 205 between the absolute value of the difference and a value indicating the validity. The predetermined relationship 205 between the absolute value of the difference and the value indicating the validity may be stored in a memory 111 as a table, or as shown in FIG. 4A, a graph or a function indicating the relationship 205 between the difference (feature value) and the value indicating the validity (validity information) may be predetermined and stored in the memory 111, and the validity information generation unit 110 may read out from the memory 111 and use the relationship 205. In an example of FIG. 4A, it is set that if the difference is smaller than a certain threshold, the value indicating the validity is large, and if the difference is larger than the certain threshold, the value indicating the validity is small. Further, the predetermined relationship 205 between the absolute value of the difference and the value indicating the validity may be set based on data used for training.

One image element here does not necessarily need to be one image element, and may be a region having a predetermined size. For example, a region having a predetermined number of pixels can be set to one image element. In that case, as an pixel value of the image element, a representative value obtained by a predetermined calculation method such as an average value, a maximum value, or a minimum value of the pixels constituting the image elements is used.

In the above description, the case where the ultrasonic image 202 and the estimated image 203 have the same image size has been described, but the ultrasonic image 202 and the estimated image 203 may have different sizes and data formats. In that case, the validity information generation unit 110 may calculate a value indicating validity for any corresponding data included in the ultrasonic image 202 and the estimated image 203.

The calculation of the validity information 206 by the validity information generation unit 110 can take not only the method of obtaining the difference shown here but also various calculations for comparing the estimated image 203 and the ultrasonic image 202. For example, instead of the difference, a value obtained by normalizing a difference between two images with a maximum signal intensity in the images and peak signal to noise ratio (PSNR) may be used, or a calculation such as a structure similarity (SSIM) index for comparing each region in the images may be used.

For example, the validity information generation unit 110 may generate the validity information 206 by calculating an image feature value in each of the estimated image 203 and the ultrasonic image 202 for each region set in the image, and comparing the image feature values with each other. The image feature value may be calculated using a texture analysis method, for example, a feature value calculated by a texture analysis using a co-occurrence matrix may be used.

The image processing unit 112 generates an ultrasonic image 207 to be displayed on the image display unit 104 based on the estimated image 203 and the validity information 206. Accordingly, not only the estimated image 203 but also the validity information 206 as a basis for determining the validity of the estimated image 203 can be displayed to the user. The image display unit 104 displays the ultrasonic image 207 generated by the image processing unit 112 to the user. The ultrasonic image 207 will be described in detail later.

Here, the trained neural network 109 will be described. The neural network 109 is trained in advance using the training data, whereby a weight for each node is determined. A training method of the neural network 109 will be described with reference to FIG. 5.

For training of the neural network 109, training input data 211 and training reference data 210 is used as the training data. The training input data 211 is data generated by the similar processing as that for generating the ultrasonic image 202. The training reference data 210 is target data to be output from the neural network. Weights of nodes included in a plurality of layers constituting the neural network 109 are optimized while inputting training input data 211 to the neural network 109 and referring to the training reference data 210. Specifically, training output data 212 that is the output of the neural network 109 when the training input data 211 is input and the training reference data 210 are compared by a loss function 213, and weight update 214 of the node of the neural network 109 is performed such that the loss function is minimized. For the weight update 214, for example, a back-propagation method is used.

For example, an image reconstructed using reception signals obtained by a small number of transmissions is used as the training input data 211, and an image reconstructed using reception signals respectively obtained by a larger number of transmissions than that of the training input data 211 is used as the training reference data 210. In other words, an ultrasonic image in which a density of transmission scanning lines is higher than that of the training input data 211 can be used as the training reference data 210. In this way, the neural network 109 after being trained can output, from the ultrasonic image 202, the estimated image 203 that estimates the image reconstructed from the reception signals when the number of transmissions is large. The training data may use an ultrasonic image as input data and may use an ultrasonic image in which a density of at least one of the transmission scanning line and a reception scanning line is higher than that of the input data 211 as the training reference data 210.

A reception signal (RF data) can be used as the training input data 211, and a reception signal, obtained by setting a frequency of a transmission signal of an ultrasonic wave to be transmitted to the subject 114 to be higher than a transmission signal when the reception signal of the training input data is obtained, can be used as the training reference data 210. The neural network 109 after being trained by such training data 211 and training reference data 210 can output, from the reception signal (RF data) 201, an estimated reception signal 223 when the frequency of the transmission signal is set higher. Similarly, an ultrasonic image can be used as the training input data 211, and an ultrasonic image, obtained by setting a frequency of a transmission signal of an ultrasonic wave to be transmitted to the subject 114 to be higher than a transmission signal when an ultrasonic image of the training input data is generated, can be used as the training reference data 210. The neural network 109 after being trained by such training input data 211 and training reference data 210 can output, from the ultrasonic image 202, the estimated image 203 for estimating the ultrasonic image when the frequency of the transmission signal is set higher.

The training of the neural network 109 may be performed using the training input data 211 and the training reference data 210 imaged by the same ultrasonic imaging device 100. Further, after training of another neural network having the same structure is performed by using the training input data and the training reference data 210 imaged using different devices, only the weights are stored in the neural network 109 of the ultrasonic imaging device 100.

The relationship 205 between the difference (feature value) used by the validity information generation unit 110 to generate the validity information and the value indicating the validity may be set based on a behavior of the neural network 109 with respect to the training input data 211. For example, the training input data 211 is input as the ultrasonic image 202 to the trained neural network 109 to generate the estimated image 203, and the difference (feature value) between the estimated image 203 and the ultrasonic image 202 is calculated. The calculation is performed for each of a plurality of pieces of the training input data 211, and a probability distribution of a plurality of the obtained differences is calculated as shown in FIG. 4B. The relationship 205 between the difference (feature value) and the value indicating the validity is set as shown in FIG. 4B such that the larger the obtained probability distribution is, the larger the value indicating the validity (validity information) is.

Specifically, as shown in FIG. 4B, when the training input data 211 is input to the neural network 109, the difference between the estimated image 203 output from the neural network 109 and the training input data 211 (ultrasonic image 202) is obtained, and the probability distribution of the difference (a hatched histogram in FIG. 4B) is obtained. The relationship 205 (shown by a dotted line in FIG. 4B) between the difference (feature value) and the validity information is generated such that the probability of the obtained difference is proportional to the value indicating the validity (validity information).

In other words, within a range (range 411 in FIG. 4B) of a distribution of the difference between a plurality of pieces of the training input data 211 and a plurality of pieces of the output data 203 output respectively when the plurality of pieces of training input data 211 used for training (learning) of the neural network 109 is input to the trained neural network 109, the value indicating the validity is set to a larger value than other ranges. Accordingly, when the behavior (the obtained estimated image 203) when the ultrasonic image 202 is input to the neural network 109 is similar as the behavior when the training input data 211 is input, the validity information generation unit 110 can output a large value indicating the validity based on FIG. 4B.

The relationship 205 between the difference (feature value) and the value indicating the validity may be determined regardless of the training input data 211. For example, as already described with reference to FIG. 4A, when the difference is equal to or smaller than a certain threshold, as valid output, a large value may be output as a value (information) indicating validity, and when the difference is smaller than the threshold, as invalid output, a small value may be output as a value (information) indicating validity.

Next, operations of the ultrasonic imaging device of the present embodiment will be described in order with reference to FIG. 6.

First, in step S101, the transmission beam former 106 transmits a transmission signal to the ultrasonic element 113 of the probe 102. The ultrasonic element 113 transmits an ultrasonic wave to the subject 114. The ultrasonic element 113 receives an ultrasonic wave interacting with the subject 114, and the image generation unit 108 performs the signal processing, the phasing processing, and the like on the reception signal (RF data 201) to generate the ultrasonic image 202 (step S102). Next, the neural network 109 receives the ultrasonic image 202 and outputs the estimated image 203 (step S103).

Next, the validity information generation unit 110 obtains the difference between the estimated image 203 and the ultrasonic image 202 and sets the absolute value as validity information, or based on the difference, generates the value indicating the validity (validity information) 206 with reference to the predetermined relationship 205 (step S104). Next, the image processing unit 112 generates the ultrasonic image 207 based on the estimated image 203 and the validity information 206 (step S105). The image display unit 104 displays the ultrasonic image 207 (step S106).

Based on input received from the user by the console 103, it is determined whether the imaging is to be ended. If the imaging is not to be ended, the processing returns to step S101, the same operation is repeated, and the ultrasonic image 207 displayed on the image display unit 104 in step S106 is updated. If the imaging is ended, a series of operations are ended (step S107).

With the above procedure, the user can determine the validity of the estimated image 203 output from the neural network 109 by viewing the ultrasonic image 207 displayed on the image display unit 104.

Examples of images generated by the image processing unit 112 and displayed on the image display unit 104 will be described with reference to FIG. 7.

As shown at (a) in FIG. 7, the image processing unit 112 can generate the ultrasonic image 207 in which the estimated image 203 and the validity information 206 are superimposed. In a superimposing method, black and white may be used for luminance of the estimated image 203 and a color such as red may be used for the validity information 206.

Further, as shown at (b) in FIG. 7, the image processing unit 112 may generate the ultrasonic image 207 in which the estimated image 203 and the validity information 206 are arranged adjacently. Accordingly, the user can compare the estimated image 203 with the validity information 206.

Further, as shown at (c) in FIG. 7, the image processing unit 112 may generate the ultrasonic image 207 in which the validity information 206 is displayed in a display region provided in the estimated image 203. By these methods, the user can know the validity information 206 while observing the estimated image 203.

The image processing unit 112 may generate the ultrasonic image 207 in which the validity information 206 is intermittently displayed while the estimated image 203 is displayed. That is, the ultrasonic image 207 is generated in which the following is repeated at regular intervals: in a certain frame, the validity information 206 is superimposed on the estimated image 203, and in a certain frame, only the estimated image 203 is set as the ultrasonic image 207. By this method, the user can observe the estimated image 203 without being disturbed by the validity information 206, and can check the validity information 206 at regular time intervals.

The image processing unit 112 may generate the ultrasonic image 207 in which the estimated image 203 is corrected based on the validity information 206. The ultrasonic image 207 may be generated by performing processing of, for example, reducing the luminance of the estimated image 203 for a region where the validity information 206 has a small value, that is, a region where the validity is estimated to be low, and increasing the luminance of the estimated image 203 for an area where the validity is estimated to be high. By such a method, the user is more likely to focus on only image regions that are more valid.

The image processing unit 112 may take statistics for all regions or a part of the regions of the validity information 206, summarize values (information) indicating the validity of the regions into a certain numerical value, and generate the ultrasonic image 207 in which the numerical value is displayed on the ultrasonic image 207. Accordingly, the user can easily determine the validity of the estimated image 203 in the region of interest by viewing only the numerical value.

Another example of the operations of the ultrasonic imaging device 100 will be described with reference to FIG. 8. In the example of FIG. 8, in accordance with input of the user, the ultrasonic imaging device 100 displays validity information only when the user requests to display determination material related to validity.

Steps S111 to S113 and steps S118 to S119 in FIG. 8 are similar operations as steps S101 to S107 described in FIG. 6, and description thereof will be omitted.

In step S114 of FIG. 8, whether to display the validity information is switched based on information input by the user from the console 103. That is, when the user requests to display the validity information, operations similar to those in steps S104 to S105 in FIG. 6 are performed in steps S116 to S117, the validity information generation unit 110 generates the validity information 206, and the image processing unit 112 generates the ultrasonic image 207 from the validity information 206 and the estimated image 203.

On the other hand, if the user does not request to display the validity information in step S114, the image processing unit 112 performs image processing based only on the estimated image 203 and generates the ultrasonic image 207 (step S115).

In an operation example of FIG. 8, the ultrasonic imaging device 100 can provide the validity information 206 only when the user needs the determination material related to the validity.

The input received by the console 103 from the user may include not only presence or absence of the display of the validity information as shown in FIG. 8 but also a setting of various parameters related to a method of presenting the validity information. For example, the console 103 may receive, from the user, a setting of a display luminance gain of the validity information 206, a setting of a frame extinction rate at which the validity information 206 is intermittently displayed, a setting of luminance reduction of the estimated image 203 to be reduced based on the validity information 206 and the like.

Further, the user may switch a method of reflecting the validity information 206 onto the ultrasonic image 207. For example, the user may select one of the reflection methods (a)-(c) shown in FIG. 7. Accordingly, the determination material related to the validity of the estimated image 203 can be provided according to the interest of the user related to the validity of the estimated image.

Modification of Embodiment 1

In Embodiment 1 described above, the neural network 109 outputs the estimated image 203 using the ultrasonic image 202 as the input data, but the present embodiment is not limited thereto. The input of the neural network 109 may use data at a time point such as when an ultrasonic image is generated from the RF data 201. For example, the received RF data itself, RF data after reception beam forming (phasing), or data obtained by adding a plurality of pieces of the RF data after reception beam forming may be used as the input data for the neural network 109. Further, ultrasonic image data after image processing, logarithmic compression and the like may be used as the input data of the neural network 109.

When the RF data 201 is used as the input data of the neural network 109, the RF data in the same dimension can be output from the neural network 109 as the estimated signal 223.

As a specific example, as shown in FIG. 3B, the neural network 109 is configured to receive a reception signal 222 that is phased by the reception beam former 120 and output the estimated reception signal 223 in the same dimension. The image generation unit 108 is arranged at a subsequent stage of the neural network 109, and the image generation unit 108 generates an ultrasonic image based on the estimated reception signal 223. The validity information generation unit 110 obtains a difference between the reception signal 222 input to the neural network 109 and the estimated reception signal 223 output from the neural network 109, and calculates information indicating validity based on the difference.

In a case of the configuration of FIG. 3B, for example, a reception signal can be used as input data for training the trained neural network 109, and a reception signal obtained by setting a frequency of a transmission signal of an ultrasonic wave to be transmitted to the subject 114 to be higher than a transmission signal when a reception signal of training input data is obtained can be used as training reference data. Accordingly, when the reception signal 222 is received, the trained neural network 109 can output the estimated reception signal 223 obtained by setting the frequency of the transmission signal of the ultrasonic wave to be transmitted to the subject 114 to be higher than the transmission signal when the reception signal 222 is obtained.

Further, the neural network 109 may be configured to use the RF data 201 as input data and output an ultrasonic image as the estimated image 203.

As a specific example, as shown in FIG. 3C, the neural network 109 is configured to receive the reception signal 222 and output the estimated ultrasonic image 203. In this case, the image generation unit 108 is arranged in parallel with the neural network 109 at a subsequent stage of a reception beam former 120, and the image generation unit 108 is configured to generate an ultrasonic image from the reception signal 222. The validity information generation unit 110 obtains a difference between an ultrasonic image generated by the image generation unit 108 from the reception signal 222 and the estimated ultrasonic image 203 output from the neural network 109, and calculates information indicating validity based on the difference.

Embodiment 2

An ultrasonic imaging device according to Embodiment 2 will be described. In the ultrasonic imaging device according to Embodiment 2, the validity information generation unit 110 extracts a feature value from one of the reception signal (RF data), the ultrasonic image, the estimated reception signal, the estimated ultrasonic image, and the output of the intermediate layer of the neural network, and obtains a value indicating validity corresponding to the extracted feature value based on the predetermined relationship 205 between the feature value and the value indicating the validity.

FIG. 9 shows an example of a configuration of the ultrasonic imaging device according to Embodiment 2. In the configuration of FIG. 9, the validity information generation unit 110 generates the validity information 206 based on intermediate layer output 215 that is output of an intermediate layer 115 of the neural network 109. This configuration will be described with a focus on differences from Embodiment 1.

The neural network 109 is configured with a plurality of continuous functions, and each of the functions is called a layer. The intermediate layer 115 refers to a function in the neural network 109, and an output value of the function is referred to as the intermediate layer output 215. For example, in a case of a forward propagation neural network, an output value of an activation function corresponds to the intermediate layer output 215.

As shown in FIG. 9, the validity information generation unit 110 receives the intermediate layer output 215. The validity information generation unit 110 generates the validity information 206 based on the intermediate layer output 215. For example, the validity information generation unit 110 reads the relationship 205 between the feature value and the validity information, which is stored in the memory 111 in advance, and generates the validity information 206 from the intermediate layer output 215 based on the relationship 205.

The relationship 205 between the feature value and the validity information, which is stored in the memory 111 in advance, is generated, for example, as follows. First, the training input data 211 is input to the trained neural network 109, and the intermediate layer output 215 at that time is obtained. The above processing is performed for the plurality of pieces of training input data 211 to obtain a plurality of pieces of intermediate layer output 215. Information related to a pattern (feature value) of the intermediate layer output 215 when the training input data 211 is input to the neural network 109 is obtained by averaging the plurality of pieces of obtained intermediate layer output 215 or performing pattern classification.

Further, the relationship 205 between the feature value and the validity information is generated in advance such that the intermediate layer output 215 indicating output of a pattern (feature value) similar to a case where the training input data 211 is input has high validity, and the intermediate layer output 215 indicating output of a pattern (feature value) different from the case where the training input data 211 is input has low validity. The generated relationship 205 between the feature value and the validity information is stored in the memory 111.

Further, when the actual ultrasonic image 202 is input to the neural network 109, the validity information generation unit 110 receives the intermediate layer output 215 of the intermediate layer 115, and obtains validity information (a value indicating validity) corresponding to the intermediate layer output 215 with reference to the relationship 205 between the feature value and the validity information, which is read from the memory 111. When the value indicating the validity is large, the validity information generation unit 110 can determine that the ultrasonic image 202 that is input data to the neural network 109 has the same behavior as the training input data 211. Therefore, the validity information generation unit 110 can determine whether the ultrasonic image 202 is included in a range trained by the training input data 211 based on the value of the validity information, and if the ultrasonic image 202 is included in the range trained by the training input data 211, the validity information generation unit 110 can output validity information indicating that the validity of the estimated image 203 to be output is high.

Further, in FIG. 9, a middle layer of the neural network 109 is used as the intermediate layer 115, but the intermediate layer 115 is not limited to the middle layer, and any layer between an input layer and an output layer may be used as the intermediate layer 115.

As shown in FIG. 10, when the neural network 109 in which the number of nodes varies depending on a layer, the layer having the smallest number of nodes may be used as the intermediate layer 115 and an output thereof may be set as the intermediate layer output 215. Since it is generally said that the layer with the smallest number of nodes is easy to show features, by using data output from the layer as the intermediate layer output 215, the validity information generation unit 110 can more easily determine whether the ultrasonic image 202 that is input data has the same behavior as the training input data 211.

As input to the validity information generation unit 110, rather than the intermediate layer output 215, the ultrasonic data 202 or any data during processing in the image generation unit 108 may be used, or the estimated image 203 may be used, or any combination thereof may be used. By using the method, the validity information 206 of the estimated image 203 can be generated even when the ultrasonic data 202 is in an RF data format and the estimated image 203 is in a different data format, such as an image data format. That is, the validity information 206 of the estimated image 203 can be generated even when data formats of the input and the output of the neural network 109 are different.

In FIG. 9, a configuration corresponding to FIG. 3A in which the ultrasonic image 202 is input to the neural network 109 is shown as the configuration of the ultrasonic imaging device, but Embodiment 2 is not limited thereto. Of course, other configurations such as a configuration in which a reception signal is input to the neural network 109 shown in FIGS. 3B and 3C and the like are possible.

Embodiment 3

An ultrasonic imaging device according to Embodiment 3 will be described with reference to FIGS. 11 and 12.

The ultrasonic imaging device according to Embodiment 3 has the similar configuration as that of Embodiment 1, but the validity information generation unit 110 is different from that of Embodiment 1 in that an image element size for calculating validity information is changed according to a wavelength of a transmitted ultrasonic wave or a received ultrasonic wave.

FIG. 11 is a diagram showing a configuration of a main part of the ultrasonic imaging device according to Embodiment 3, and FIG. 12 is a diagram showing the image element size and the wavelength of the transmission ultrasonic wave by which the validity information generation unit 110 calculates the validity information.

The user sets, through the console 103, a wavelength of an ultrasonic wave 116 transmitted by the ultrasonic probe 102. The setting of the transmission ultrasonic wave may be configured so that the wavelength and a frequency of the ultrasonic wave can be directly set as numerical values, or may be switched indirectly by setting an imaging mode.

The control unit 105 instructs, according to a wavelength of the transmission ultrasonic wave 116 set through the console 103, the transmission beam former 106 to generate a transmission signal for transmitting an ultrasonic wave having the wavelength. The transmission beam former 106 transmits a transmission signal to the ultrasonic probe 102 via the transmission and reception switch 107. Accordingly, the transmission ultrasonic wave 116 having the set wavelength is transmitted from the ultrasonic probe 102.

The control unit 105 sends information of a transmission wavelength to the validity information generation unit 110, and the validity information generation unit 110 changes a size of a coordinate grid 301 of the validity information 206 to be generated, according to the information of the transmission wavelength. FIG. 11 shows a case where the estimated image 203, operation data 204 of the intermediate layer 115 of the neural network, and the ultrasonic data 202 are input to the validity information generation unit 110, but as described in Embodiments 1 and 2, any combination of these data may be input to the validity information generation unit 110.

A wavelength of the reception signal 201 is detected in the image generation unit 108, and the validity information generation unit 110 may change the image element size according to the wavelength.

A method for changing a size of the coordinate grid 301 will be described in detail with reference to FIG. 12. Here, a case where the validity information 206 generated by the validity information generation unit 110 is in a two-dimensional image format will be described as an example. The coordinate grid 301 of the validity information 206 to be generated is configured with an x coordinate and a y coordinate. A region defined by the coordinate grid 301 is one image element. The validity information generation unit 110 changes an image element size of the validity information in an x direction 302 and an image element size of the validity information in a y direction 303 according to a wavelength 305 of a waveform 304 of the transmission ultrasonic wave.

The validity information generation unit 110 may be configured to set the image element size in the x direction 302 and the image element size in the y direction 303 to a size proportional to the wavelength 305 of the transmission ultrasonic wave by a certain constant, or may be in a form in which the image element sizes 302 and 303 corresponding to the wavelength 305 are changed according to a predefined table.

The image element size in the x direction 302 and the image element size in the y direction 303 may be the same, or may use different values.

By setting the coordinate grid 301 of the validity information in this way, an appropriate grid size (image element size) can be set during generation of the validity information 206, and a calculation cost can be reduced.

The format of the validity information 206 is not limited to the two-dimensional image format, and may be a three-dimensional volume format, or further may be a three-dimensional or four-dimensional format having a plurality of frames. Further, for example, when a sector probe or a convex probe or the like is used as the ultrasonic probe, the coordinate grid may be generated using another spatial coordinate system such as a polar coordinate system instead of a Cartesian coordinate system.

Embodiment 4

An ultrasonic imaging device according to Embodiment 4 will be described with reference to FIGS. 13 and 14.

The ultrasonic imaging device of Embodiment 4 has a similar configuration as that of Embodiment 1, but an aspect of the ultrasonic image 207 that is generated by the image processing unit 112 and displayed on the image display unit 104 is different from that of Embodiment 1.

In Embodiment 4, the image processing unit 112 performs processing of generating the ultrasonic image 207 by using the validity information 206 to update the estimated image 203, or performs processing such as selecting an image used to generate the ultrasonic image 207 from a plurality of the estimated images 203.

The processing in which the image processing unit 112 updates the estimated image 203 from the validity information 206 to generate the ultrasonic image 207 will be described with reference to FIG. 13.

The image processing unit 112 generates the ultrasonic image 207 based on the ultrasonic image 202, the validity information 206, and the estimated image 203. At this time, in accordance with the validity information 206, processing of changing how the estimated image 203 and the ultrasonic image 202 are reflected on the ultrasonic image 207 is performed.

For example, the image processing unit 112 assigns the estimated image 203 to the ultrasonic image 207 for a region where the validity information 206 exceeds a certain threshold, that is, has high validity, and assigns the ultrasonic image 202 to the ultrasonic image 207 for a region where the validity information 206 does not exceed the certain threshold so as to generate the ultrasonic image 207.

Alternatively, the image processing unit 112 generates the ultrasonic image 207 by adding the ultrasonic image 202 and the estimated image 203 with a certain weight, and changes the weight at that time according to the validity information 206. That is, when the validity information 206 has a large value, the image processing unit 112 gives a high weight to the estimated image 203, and when the validity information 206 has a low value, the image processing unit 112 gives a high weight to the ultrasonic image 202.

Further, the image processing unit 112 may generate the ultrasonic image 207 by combining the method of switching assignment according to the validity information 206 and the method of changing the weight according to the validity information 206.

The image processing unit 112 causes the image display unit 104 to display the ultrasonic image 207 generated by such a method, and thus the user can determine whether an image is valid by viewing the ultrasonic image 207.

Further, the image processing unit 112 may be configured to display an alert superimposed on the ultrasonic image 207 or output a sound in order to notify an operator when the validity information satisfies a certain condition. Accordingly, when the validity information indicates that the validity is low, the user can be alerted not to use the estimated image 203.

Further, referring to FIG. 14, processing of the image processing unit 112 when the neural network 109 of the ultrasonic processing device includes a plurality of neural networks, each of the neural networks generates the estimated image 203, and the validity information generation unit 110 generates a plurality of pieces of the validity information 206 will be descried. The validity information generation unit 110 generates each of the plurality of pieces of validity information 206 using the estimated image 203, the ultrasonic image 202, the intermediate layer output 215, or the like for each of the plurality of neural networks.

In this case, in order to select or generate the ultrasonic image 207 having higher validity based on the plurality of pieces of validity information 206, the image processing unit 112 is configured to assign the estimated image 203 corresponding to the validity information 206 having high validity among the plurality of pieces of validity information 206 to the ultrasonic image 207, and generate the ultrasonic image 207.

Alternatively, the image processing unit 112 may be configured to generate the ultrasonic image 207 by adding a plurality of the estimated images 203 with weights according to the validity information 206.

Further, the ultrasonic image 207 may be generated by combining the method of switching assignment according to the validity information 206 and the method of changing the weight according to the validity information 206.

The image processing unit 112 causes the image display unit 104 to display the ultrasonic image 207 generated by such a method, and thus the user can determine whether an image is valid by viewing the ultrasonic image 207.

In each of the embodiments described above, the user is a person who uses the ultrasonic imaging device. The user may be a doctor or a sonographer. Further, the user may be an engineer such as a developer or a person who manages production during manufacturing. The invention may be used by such users in development and manufacturing process for performance verification during development and quality assurance during manufacturing. For example, the validity information 206 when a standard specification phantom is imaged may be used as an index for performance verification during development or as a part of determination material for quality assurance. Accordingly, efficient development, test, and manufacturing can be performed.

REFERENCE SIGN LIST

100: ultrasonic imaging device
101: ultrasonic imaging device main body
102: ultrasonic probe
103: console
104: image display unit
105: control unit
106: transmission beam former
107: transmission and reception switch
108: image generation unit
109: neural network
110: validity information generation unit
111: memory
112: image processing unit
113: ultrasonic element
114: subject
115: intermediate layer of neural network
116: transmission ultrasonic wave
201: RF data
202: ultrasonic data
203: estimated image
205: relationship between feature value and validity information
206: validity information
207: ultrasonic image
210: training reference data
211: training input data
212: training output data
213: loss function
214: weight update
215: intermediate layer output

The invention claimed is:
1. An ultrasonic imaging device, comprising:
a memory coupled to a processor, the memory storing instructions that when executed configure a processor to:
receive a reception signal output by an ultrasonic probe that has received an ultrasonic wave from a subject, and generate an ultrasonic image based on the reception signal, the reception signal obtained based on an ultrasonic wave transmitted from the ultrasonic probe;
implement a trained neural network configured to receive the generated ultrasonic image, and output an estimated ultrasonic image;
generate information indicating validity of the estimated ultrasonic image based on a difference between the ultrasonic image input to the neural network, and the estimated ultrasonic image output from the neural network; and
generate an output ultrasonic image based on the information indicating validity and the estimated ultrasonic image output from the neural network and display the output ultrasonic image on a display,
wherein absolute values of differences between a plurality of image elements of the ultrasonic image input to the neural network and the estimated ultrasonic image are calculated, each of the plurality of image elements is a predetermined number of pixels and each image element has a size defined by a region of a coordinate grid, wherein the processor is configured to change an image element size in an x direction and a y direction according to a wavelength of a waveform of the transmitted ultrasonic wave, and wherein a value indicating the information indicating validity is determined based on the absolute values of the differences and a predetermined relationship stored in the memory, the predetermined relationship is set based on a probability distribution of differences from input training data, the input training data including a plurality of reconstructed ultrasonic images.

2. The ultrasonic imaging device according to claim 1, wherein the predetermined relationship between the difference and the value indicating the validity is such that when the absolute value of the respective differences are within a predetermined range, the corresponding value indicating the validity is higher than in other ranges.

3. The ultrasonic imaging device according to claim 1, wherein the processor configured to obtain a difference between the ultrasonic image input to the neural network and the estimated ultrasonic image output from the neural network, and calculate the information indicating the validity based on the difference.

4. The ultrasonic imaging device according to claim 1, wherein the trained neural network has been trained using training data, and for the training data, at least one ultrasonic image in which a density of at least one of a transmission scanning line and a reception scanning line is higher than that of the input data is used as training reference data.

5. The ultrasonic imaging device according to claim 1, wherein the trained neural network has been trained using training data, and for the training data, ultrasonic images generated from a reception signal that is output by the ultrasonic probe when a transmission signal of an ultrasonic wave is transmitted from the ultrasonic probe to the subject and the ultrasonic probe receives an ultrasonic wave from the subject is used as input data, and at least one ultrasonic image generated from the reception signal output by the ultrasonic probe when a frequency of the transmission signal transmitted to the subject is higher than that of the input data is used as training reference data.

6. The ultrasonic imaging device according to claim 1, wherein a value indicating the information indicating validity is given for each image element arranged two-dimensionally or three-dimensionally.

7. The ultrasonic imaging device according to claim 1, wherein the processor is configured to warn a user when the validity indicated by the information indicating the validity is lower than a predetermined condition.

8. The ultrasonic imaging device according to claim 1, wherein the trained neural network includes a plurality of neural networks, and each of the neural networks generates the estimated reception signal or the estimated image, wherein the processor is configured to generate the information indicating the validity for each of a plurality of the estimated images generated by the plurality of neural networks, and wherein the processor is configured to select or generate more valid information from a plurality of pieces of the information indicating the validity.

9. An image processing device, comprising:

a memory coupled to a processor, the memory storing instructions that when executed configure a processor to:

implement a trained neural network configured to receive an ultrasonic image, and output an estimated ultrasonic image;

generate information indicating validity of the estimated ultrasonic image based on a difference between or the ultrasonic image, and the estimated ultrasonic image output from the neural network; and generating an output ultrasonic image based on the information indicating validity and the estimated ultrasonic image output from the neural network and display the output ultrasonic image on a display, wherein absolute values of differences between a plurality of image elements of the ultrasonic image input to the neural network and the estimated ultrasonic image are calculated, each of the plurality of image elements is a predetermined number of pixels and each image element has a size defined by a region of a coordinate grid, wherein the processor is configured to change an image element size in an x direction and a y direction according to a wavelength of a waveform of the transmitted ultrasonic wave, and wherein a value indicating the information indicating validity is determined based on the absolute values of the differences and a predetermined relationship stored in memory, the predetermined relationship is set based on a probability distribution of differences from input training data, the input training data including a plurality of reconstructed ultrasonic images.

10. The ultrasonic imaging device according to claim 1, wherein the output ultrasonic image is generated by superimposing the information indicating validity on the estimated ultrasonic image output from the neural network.

11. The image processing device according to claim 9, wherein the output ultrasonic image is generated by superimposing the information indicating validity on the estimated ultrasonic image output from the neural network.

* * * * *